United States Patent [19]

Richardson et al.

[11] Patent Number: 6,138,085
[45] Date of Patent: Oct. 24, 2000

[54] INFERRING SEMANTIC RELATIONS

[75] Inventors: Stephen D. Richardson, Redmond; Lucy Vanderwende, Bellevue, both of Wash.

[73] Assignee: Microsoft Corporation, Redmond, Wash.

[21] Appl. No.: 08/904,226

[22] Filed: Jul. 31, 1997

[51] Int. Cl.[7] .................................................. G06F 17/30
[52] U.S. Cl. .................................................. 704/1; 704/9
[58] Field of Search .......................... 704/1, 8, 9, 10; 707/530, 531, 532, 5, 2

[56] References Cited

U.S. PATENT DOCUMENTS

| | | | |
|---|---|---|---|
| 5,128,865 | 7/1992 | Sadler | 704/9 |
| 5,237,503 | 8/1993 | Bedecarrax | 704/10 |
| 5,317,504 | 5/1994 | Gallant | 707/532 |
| 5,424,947 | 6/1995 | Nagao et al. | 704/9 |
| 5,724,594 | 3/1998 | Pentheroudakis | 704/9 |
| 5,752,052 | 5/1998 | Richardson et al. | 704/9 |
| 5,933,822 | 8/1999 | Branden-Harder et al. | 704/5 |

OTHER PUBLICATIONS

Salton, Gerard, Michael J. McGill, *Introduction to Modern Information Retrieval*, McGraw–Hill Publishing Co., New York, NY, 1983, entire book.

Sumita, Eiichiro, and Hitoshi Iida, "Experiments and Prospects of Example–Based Machine Translation," in Proceedings of the 29th Annual Meeting of the ACL, 1991, pp. 185–192.

Sato, Satoshi, *Example–Based Machine Translation*, Kyoto University, Kyoto, Japan, 1991, Chap. 1, "Introduction," pp. 1–5; Chap. 2, "Learning Translation Rules," pp. 6–16.

Bookman, Lawrence A., *Trajectories Through Knowledge Space: A Dynamic Framework Framework for Machine Comprehension*, Kluwer Academic Publishers, Boston, MA, 1994, entire book.

Grishman, Ralph and John Sterling, "Generalizing Automatically Generated Selectional Patterns," in Proceedings of the 15th International Conference on Computational Linguistics, vol. II, Kyoto, Japan, Aug. 5–9, 1994, pp. 742–747.

Resnik, Philip, "Disambiguating Noun Groups With Respect to WordNet Senses," in *Proceedings of the Third Workshop on Very Large Corpora*, Boston, MA, Jun. 30, 1995, pp. 1–16.

Pereira et al., "Distributional Clustering of English Words," in Proceedings of the 31st Annual Meeting of the Assoc. for Computational Linguistics, Columbus, OH, Jun. 22–26, 1993, pp. 183–190.

(List continued on next page.)

*Primary Examiner*—Vivian Chang
*Assistant Examiner*—Patrick N. Edouard
*Attorney, Agent, or Firm*—Westman, Champlin & Kelly, P.A.

[57] ABSTRACT

The present invention provides a facility for determining, for a semantic relation that does not occur in a lexical knowledge base, whether this semantic relation should be inferred despite its absence from the lexical knowledge base. This semantic relation to be inferred is preferably made up of a first word, a second word, and a relation type relating the meanings of the first and second words. In a preferred embodiment, the facility identifies a salient semantic relation having the relation type of the semantic relation to be inferred and relating the first word to an intermediate word other than the second word. The facility then generates a quantitative measure of the similarity in meaning between the intermediate word and the second word. The facility further generates a confidence weight for the semantic relation to be inferred based upon the generated measure of similarity in meaning between the intermediate word and the second word. The facility may also generate a confidence weight for the semantic relation to be inferred based upon the weights of one or more paths connecting the first and second words.

29 Claims, 7 Drawing Sheets

OTHER PUBLICATIONS

Braden–Harder, Lisa, *Natural Language Processing: The PLNLP Approach,* Kluwer Academic Publishers, Boston, MA, 1993, Chap. 19, "Sense Disambiguation Using Online Dictionaries," pp. 247–261.

Dagan et al., "Similarity–Based Estimation of Word Cooccurrence Probabilities," in Proceedings of the 32nd Annual Meeting of the ACL, 1994, pp. 272–278.

Resnick, Philip, "WordNet and Distributional Analysis: A Class–Based Approach to Lexica Discovery," in *Statistically–Based Natural Language Programming Techniques,* Papers From the 1992 AAAI Workshop, Menlo Park, CA, 1992, pp. 48–56.

Brown et al., "Class–Based n–gram Models of Natural Language," *Computational Linguistics* 18(4):467–479, Dec. 1992.

Dagan et al., "Contextual Word Similarity and Estimation From Sparse Data," in Proceedings of the $31^{st}$ Annual Meeting of the Assoc. for Computational Linguistics, Columbus, OH, Jun. 22–26, 1993, pp. 164–171.

Alshwi et al., "training and scaling prefernce function for disambiguting", Association of Computinal Linguistics, vol. 24, No. 4, pp. 635–648.

| path | path weight |
|---|---|
| observe —TypicalSubject→ observer ←Possessor— binoculars | $1.2 \times 10^9$ |
| observe —Means→ telescope ←Quespernym— binoculars | $6.8 \times 10^{10}$ |
| observe ←Hypernym— watch —Hypernym→ look —Means→ binoculars | $2.4 \times 10^{10}$ |
| observe —Means→ wiretap ←Quespernym— bug —Hypernym→ device ←Hypernym— binoculars | $5.7 \times 10^{11}$ |
| ... | |

INFERRING SEMANTIC RELATIONS

TECHNICAL FIELD

The present invention is directed to the field of computational linguistics, and, more specifically, to the field of automated semantic inference.

BACKGROUND OF THE INVENTION

A lexical knowledge base is a computer-readable body of information about words, including a network of semantic relations between words. Each semantic relation is a unidirectional link between two words labeled with a particular semantic relation type that relates the meanings of the two words. For example, semantic relation (1) below indicates that the meaning of "wheel" is related to the meaning of "car," in that a wheel is a part of a car:

wheel←Part-car    (1)

Semantic relations each have one of a number of standard relation types, such as: Cause, Domain, Hypernym, Location, Manner, Material, Means, Modifier, Part, Possessor, Purpose, Quasi-Hypernym ("Quespernym"), Synonym, Time, TypicalObject, TypicalSubject, and User. Semantic relations may be chained together to form semantic relation paths ("paths") relating the meanings of two words via one or more intermediate words. For example, path (2) below indicates that one of the ways that the meaning of "spin" is related to the meaning of "car" is that a wheel is a part of a car and that a wheel is typically spun:

spin-TypicalObject→wheel←Part-car    (2)

Semantic relations and semantic relation paths are useful in a broad range of natural language processing applications to identify direct and indirect relationships in meaning between pairs of words. For example, natural language parsers use this information to disambiguate the meaning of a sentence.

While useful lexical knowledge bases contain many semantic relations, even the most complete lexical knowledge bases omit some valid semantic relations. The ability to determine whether a semantic relation is valid even though it is not explicitly contained in a lexical knowledge base would therefore have significant utility.

SUMMARY OF THE INVENTION

The invention is directed to determining, for a semantic relation that does not occur in a lexical knowledge base, a quantitative assessment of whether this semantic relation should be inferred despite its absence from the lexical knowledge base. For a particular input relation (two input words joined by a unidirectional link labeled by an input relation type), a first embodiment of the invention proceeds by identifying the most salient paths, comprised of relations occurring in the lexical knowledge base, between the input words. Identifying the paths between these words establishes a semantic context in which similarity can be determined and semantic relations can be inferred. The invention then selects from the most salient paths those that begin or end with a semantic relation of the input relation type between one of the input words and an intermediate word. The invention then returns a quantitative assessment of whether the input semantic relation should be inferred despite its absence from the lexical knowledge base that is based upon either (a) the weights of the selected paths, (b) the level of similarity between the intermediate words of the selected paths and the other words, (c) or both.

In another embodiment, rather than identifying the most salient paths between the two input words, the facility instead identifies semantic relations present in the lexical knowledge base of the input relation type that relate one of the two input words to a different "intermediate" word. This embodiment bases the quantitative assessment of whether the input semantic relation should be inferred on either (a) the similarity of the intermediate word in each identified semantic relation to the other input word or (b) the weight of an artificial path comprising the identified semantic relation and a second relation corresponding to the level of similarity between the intermediate word and the other input word.

DETAILED DESCRIPTION OF THE INVENTION

The invention is directed to determining, for a semantic relation that does not occur in a lexical knowledge base, a quantitative assessment of whether this semantic relation should be inferred despite its absence from the lexical knowledge base. For a particular input relation (two input words joined by a unidirectional link labeled by an input relation type), a first embodiment of the invention proceeds by identifying the most salient paths, comprised of relations occurring in the lexical knowledge base, between the input words. Identifying the paths between these words establishes a semantic context in which similarity can be determined and semantic relations can be inferred. The invention then selects from the most salient paths those that begin or end with a semantic relation of the input relation type between one of the input words and an intermediate word. The invention then returns a quantitative assessment of whether the input semantic relation should be inferred despite its absence from the lexical knowledge base that is based upon either (a) the weights of the selected paths, (b) the level of similarity between the intermediate words of the selected paths and the other words, (c) or both.

In another embodiment, rather than identifying the most salient paths between the two input words, the facility instead identifies semantic relations present in the lexical knowledge base of the input relation type that relate one of the two input words to a different "intermediate" word. This embodiment bases the quantitative assessment of whether the input semantic relation should be inferred on either (a) the similarity of the intermediate word in each identified semantic relation to the other input word or (b) the weight of an artificial path comprising the identified semantic relation and a second relation corresponding to the level of similarity between the intermediate word and the other input word.

The need to determine whether a particular semantic relation should be inferred arises, for example, when parsing the following sentence:

We observed the bird with binoculars.

As part of parsing this sentence, the parser identifies the prepositional phrase "with binoculars," and must determine which word of the sentence this prepositional phrase modifies. This determination is also known as identifying the "attachment point" of the prepositional phrase. In the example, the prepositional phrase "with binoculars" may modify either the verb "observed" or the noun "bird." Modification of the verb "observed" is consistent with semantic relation (3) below:

observe-Means→binoculars (3)

Semantic relation (3) indicates that the activity of observing is commonly performed by means of binoculars. Modification of the noun "bird" by the prepositional phrase "with binoculars" is consistent with either of semantic relations (4) and (5) below:

bird←Possessor-binoculars (4)

bird-Part→binoculars (5)

Semantic relation (4) above indicates that the bird is the possessor of the binoculars-that is, the bird is holding the binoculars, while semantic relation (5) above indicates that the binoculars are part of the bird-that is, the binoculars, like a beak, are a body part of the bird. Although a human reader immediately realizes that semantic relations (4) and (5) are nonsensical, an automated parser needs an explicit basis for making this determination. If semantic relation (3) is valid and semantic relations (4) and (5) are not valid, then the parser may determine that the prepositional phrase "with binoculars" modifies the verb "observe." On the other hand, if either semantic relation (4) or semantic relation (5) is valid and semantic relation (3) is not valid, then the parser may determine that the prepositional phrase "with binoculars" modifies the noun "bird." Rather than rely on a binary determination of the validity of these three semantic relations, the facility may instead obtain a quantitative confidence level for each indicating the relative likelihood that the semantic relation should be inferred. The point of attachment for the modifying phrase may therefore be determined by selecting the semantic relation having the largest confidence level.

As a first measure in determining the validity of each of the above three semantic relations, the facility may search a lexical knowledge base containing a network of semantic relations known to be valid. Such a lexical knowledge base may be compiled automatically by parsing a large corpus such as a dictionary. This process is described in greater detail in U.S. patent application Ser. No. 08/277,247 entitled "Method and System for Compiling a Lexical Knowledge Base," which is hereby incorporated by reference. While such lexical knowledge bases may contain very large numbers of semantic relations, even the most complete lexical knowledge bases omit many valid semantic relations. The parser therefore uses the facility to determine whether semantic relations (3), (4), and (5) are valid despite their absence from the lexical knowledge base. Semantic relations determined to be valid despite their absence from the lexical knowledge base may further be added to the lexical knowledge base in order to expand the set of valid semantic relations contained by the lexical knowledge base.

Figure 1:
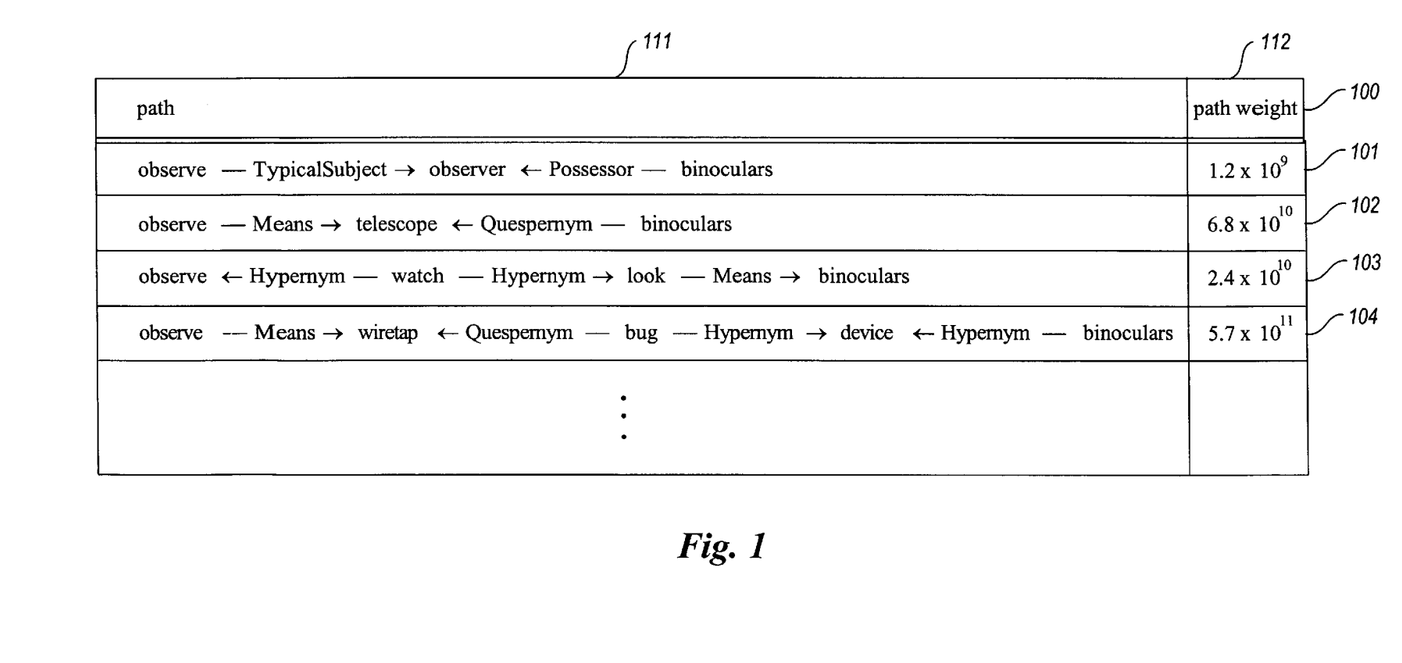
FIG. 1 shows a sample of the most salient paths between the words "observe" and "binoculars."

In order to determine whether an input semantic relation such as semantic relation (3) is valid, in the first embodiment the facility utilizes the most salient semantic relation paths occurring between the words of the input semantic relation, here "observe" and "binoculars." FIG. 1 shows a sample of the most salient paths between the words "observe" and "binoculars." For each of several such paths, FIG. 1 shows the contents of the path 111 and the weight of the path 112. For example, line 101 indicates that the weight of path (6) below is $1.2 \times 10^{-9}$:

observe-TypicalSubject→observer←Possessor-binoculars (6)

From the list of paths connecting the words "observe" and "binoculars," the facility identifies those paths in which the input relation type, here the Means relation type, is the relation type for either the first semantic relation of the path, containing the word "observe," or is the relation type of the last semantic relation of the path, containing the word "binoculars." The facility therefore identifies the paths shown on lines 102, 103, and 104. In the first embodiment, the facility uses these identified paths in accordance with one of three variations of the embodiment to determine whether to infer the input semantic relation.

In accordance with the first variation of the first embodiment, the facility determines that semantic relation (3) is valid and should be inferred based upon the weights of the identified paths. For example, given the identified paths shown on lines 102–104 of FIG. 1, the facility determines the quantitative assessment of whether semantic relation (3) should be inferred based upon the weights of these paths, $6.8 \times 10^{-10}$, $2.4 \times 10^{-10}$, and $5.7 \times 10^{-11}$, respectively. The facility may, for instance, calculate the average of these weights, or determine the maximum of these weights.

In accordance with the second variation of the first embodiment, the facility selects, for each identified path, the word in the semantic relation of the input relation type other than "observe" and "binoculars," called the "intermediate word." The facility then determines, for each identified path, the level of similarity between the intermediate word and the word "observe" or "binoculars" that is not contained in the semantic relation of the input relation type. For example, in the case of the path on line 102, the facility determines the level of similarity between the meanings of the words "telescope" and "binoculars." Similarly, for the path shown in line 103, the facility determines the level of similarity between the meanings of the words "observe" and "look." Any of several approaches to determining the level of similarity of pairs of words may be used. For example, the facility may determine the level of similarity between a pair of words by (a) looking up the words of a pair in a computer-based thesaurus, or by (b) analyzing the paths occurring between the words of the pair in the knowledge base. Those skilled in the art will appreciate that other approaches may also be used. This level of similarity is then used to determine whether the input semantic relation should be inferred.

In accordance with the third variation of the first embodiment of the invention, the facility determines that semantic relation (3) is valid and should be inferred based upon the weight of identified paths in which the intermediate word and the other input word have at least a threshold level of similarity. For example, among the identified paths shown on lines 102–104 of FIG. 1, the facility might determine that the words "telescope" and "binoculars" are similar, that the words "observe" and "look" are similar, and that the words "wiretap" and "binoculars" are dissimilar. The facility would then determine whether semantic relation (3) is valid and should be inferred by averaging the path weights for the paths shown in lines 102 and 103, then comparing the average to a minimum average path weight threshold.

In accordance with the second embodiment of the invention, rather than identifying the most salient paths between the input words, the facility instead identifies semantic relations containing one of the input words, the input relation type, and an intermediate word. Then, for each identified semantic relation, the facility determines the quantitative similarity of the intermediate word and the other input word. In the first variation of the second embodiment, the facility then bases its quantitative assessment of whether the semantic relation should be inferred on this quantitative similarity. In terms of the example, the facility might identify the semantic relation:

$$\text{look-Means} \rightarrow \text{binoculars} \tag{7}$$

The facility would then base the quantitative assessment of whether the semantic relation should be inferred on the similarity between the other input word "observe" and the intermediate word "look."

In the second variation of the second embodiment of the invention, the facility determines the weight of artificial paths between the input words each comprised of only two semantic relations: an identified semantic relation between one of the input words and an intermediate word and a special semantic "Similarity" relation representing the level of similarity between the intermediate word and the other input word. Because this path incorporates both the identified semantic relation of the input relation type and the special similarity relation, its weight captures both the weight of the identified semantic relation and the level of similarity between the intermediate word and the other input word. As an example, for the path in line 103 of FIG. 1, the facility determines the weight of the following path:

$$\text{observe} \leftarrow \text{Similarity} \rightarrow \text{look-Means} \rightarrow \text{binoculars} \tag{8}$$

The facility's quantitative assessment of whether semantic relation (3) should be inferred is based upon the weights of these paths for the identified semantic relations.

Figure 2:
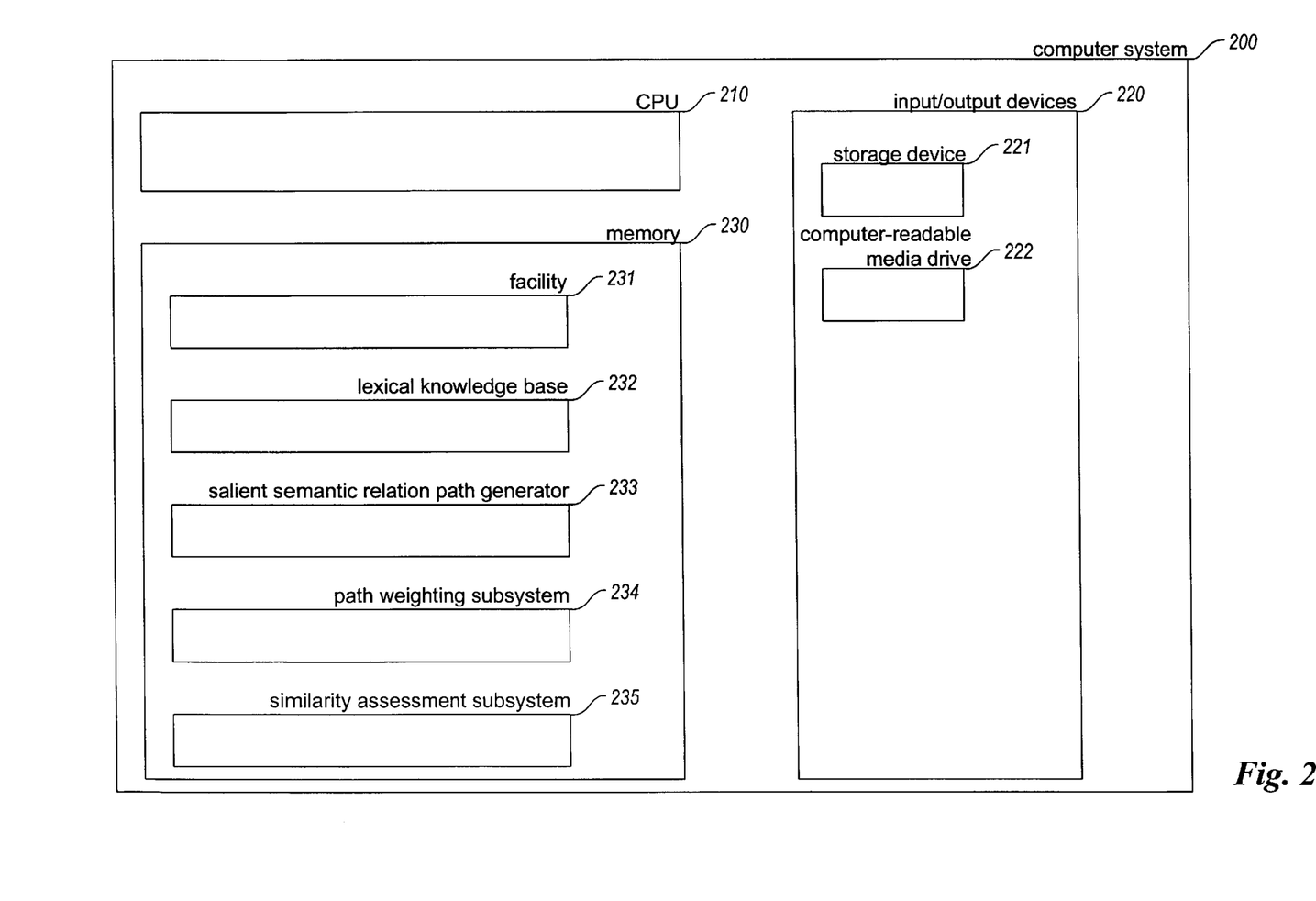
FIG. 2 is a high-level block diagram of the general-purpose computer system upon which the facility preferably executes.

FIG. 2 is a high-level block diagram of the general-purpose computer system upon which the facility preferably executes. The computer system 200 contains a central processing unit (CPU) 210, input/output devices 220, and a computer memory (memory) 230. Among the input/output devices is a storage device 221, such as a hard disk drive, and one or more computer-readable media drives 222, which can be used to install software products, including the facility, that are provided on a computer-readable medium, such as a CD-ROM. The memory 230 preferably contains the semantic relation inference facility (the facility) 231, a lexical knowledge base 232 containing a large number of semantic relations occurring in a corpus and therefore known to be valid, a salient semantic relation path generator 233 used by the facility to identify the most salient semantic relation paths between a pair of words, a path weighting subsystem 234 used by the facility to determine a weight characterizing the saliency of a particular path between two words, and a similarity assessment subsystem 235 used by the facility to determine a measure of the similarity in meaning between a pair of words. While the facility is preferably implemented on a computer system configured as described above, those skilled in the art will recognize that it may also be implemented on computer systems having different configurations.

Figure 3:
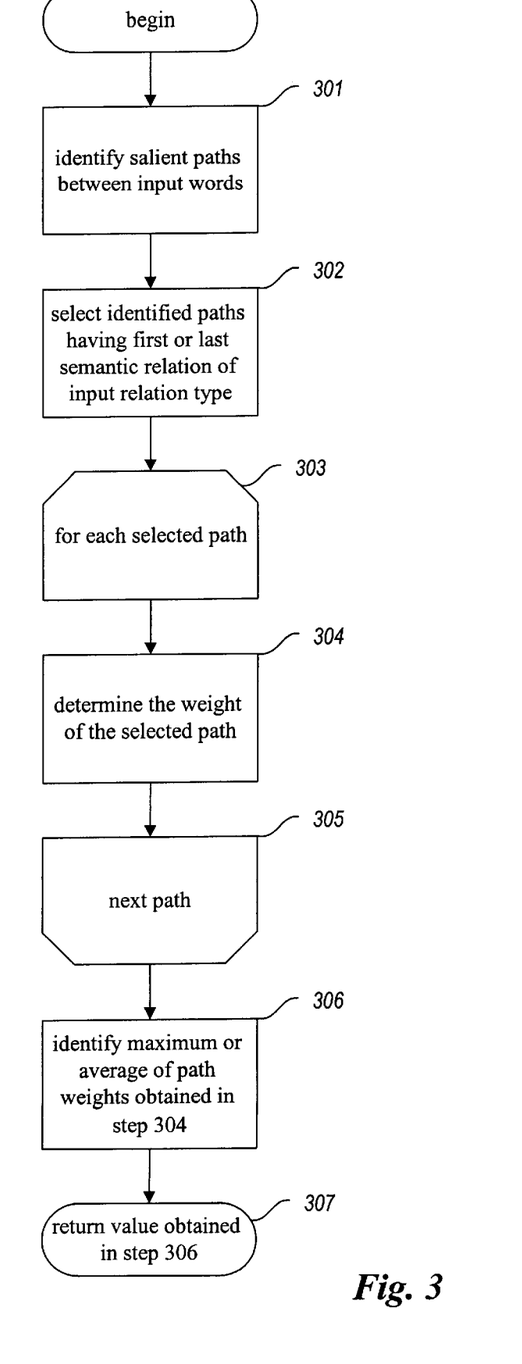
FIG. 3 is a flow diagram showing the steps preferably performed by the facility in order to determine whether an input semantic relation should be inferred in accordance with a first variation of a first embodiment of the invention.
Figure 4:
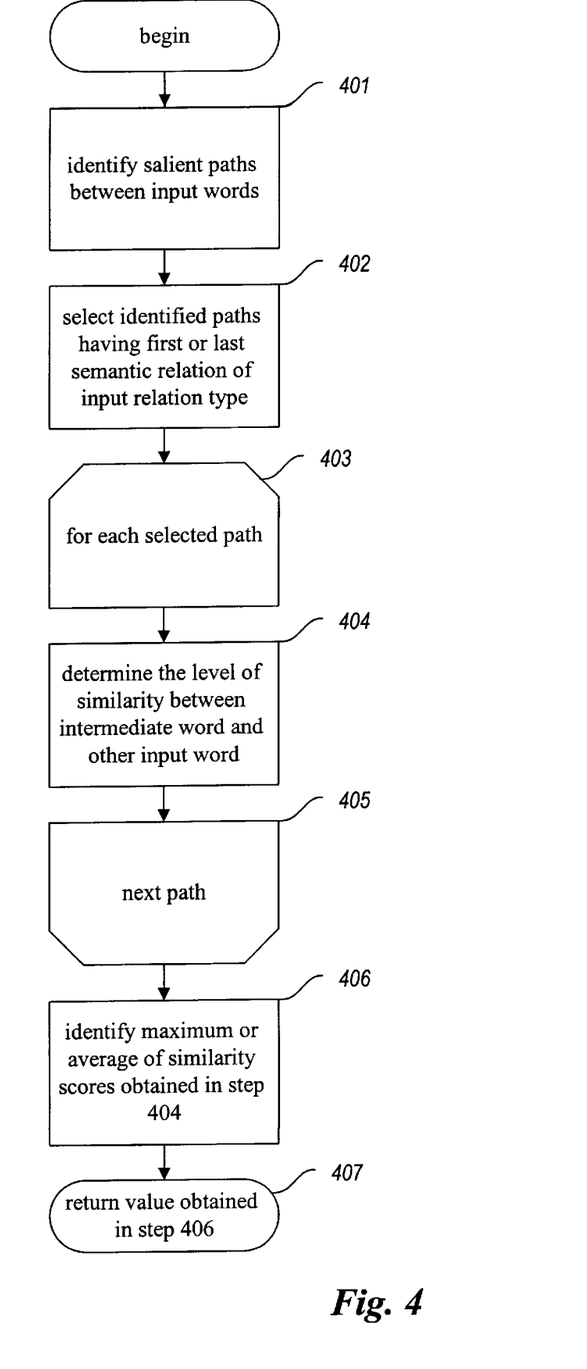
FIG. 4 is a flow diagram showing the steps preferably performed by the facility in order to determine a quantitative measure of confidence about whether an input semantic relation should be inferred in accordance with a second variation of the first embodiment of the invention.
Figure 5:
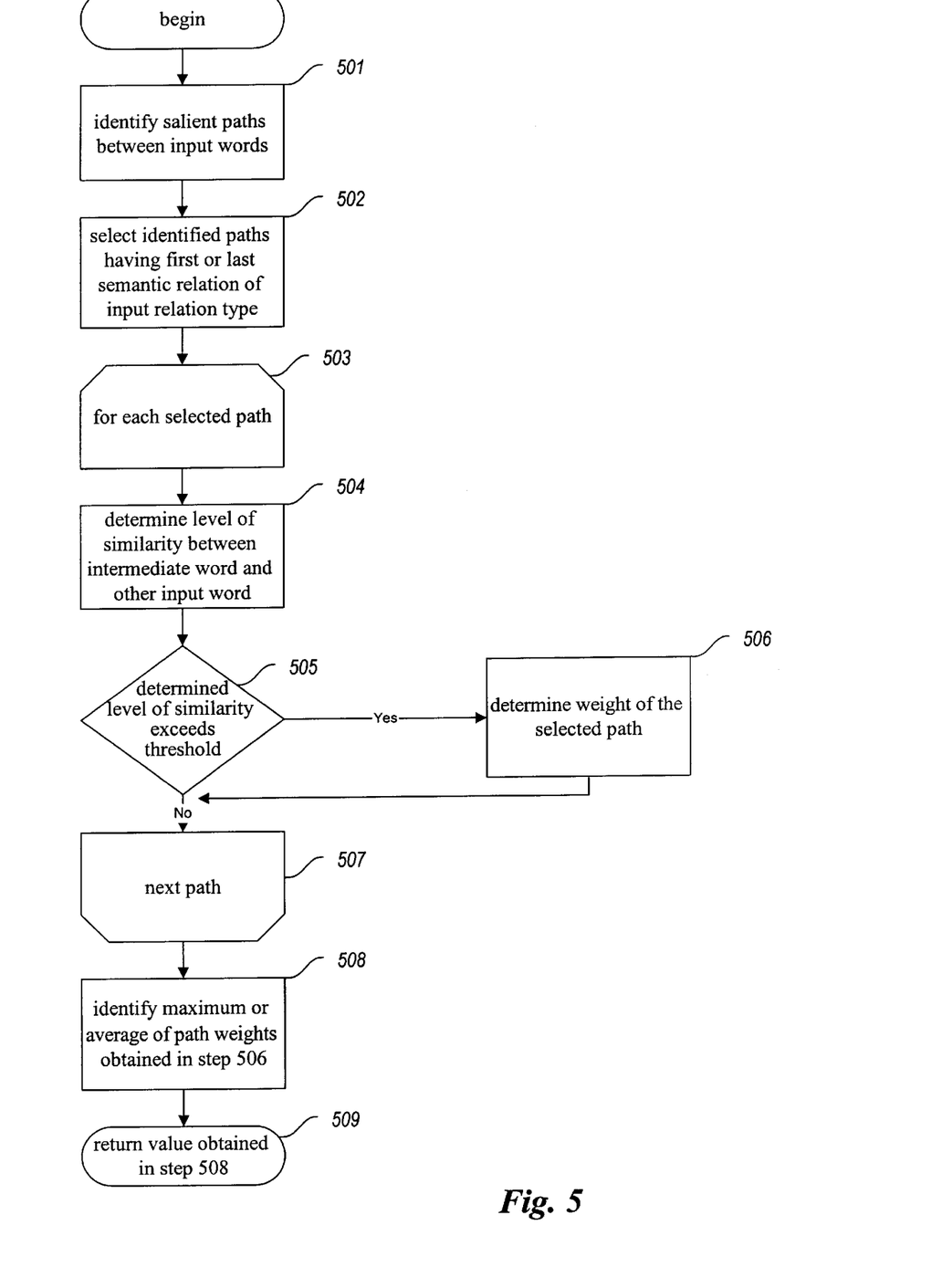
FIG. 5 is a flow diagram showing the steps preferably performed by the facility in order to determine a quantitative measure of confidence about whether an input semantic relation should be inferred in accordance with a third variation of the first embodiment of the invention.

FIGS. 3–5 show alternative versions of the steps preferably used by the facility in order to determine whether an input semantic relation should be inferred. The steps shown in one of these three figures are preferably performed by the facility in order to determine whether the meaning of the input words of the input semantic relation are related as indicated by the input relation type of the input semantic relation in cases in which the input semantic relation does not occur in the lexical knowledge base.

FIG. 3 is a flow diagram showing the steps preferably performed by the facility in order to determine a quantitative measure of confidence about whether an input semantic relation, comprised of two input words and an input relation type, should be inferred in accordance with the first variation of the first embodiment of the invention. In step 301, the facility identifies the most salient paths between the two input words using the salient semantic relation path generator 233 (FIG. 2). A preferred approach to identifying the most salient paths between a given pair of words is described in detail in U.S. patent application Ser. No. 08/904,418 entitled "Identifying Salient Semantic Relation Paths Between Two Words" (patent counsel's Docket No. 661005.521), which is hereby incorporated by reference. This preferably involves identifying all of the paths that can be assembled from the semantic relations occurring in the knowledge base, assessing a saliency score for each identified path based upon the saliency of their constituent semantic relations, and selecting those paths with the highest saliency scores. In the example discussed above, the facility identifies the paths shown in lines 101–104 of FIG. 1.

In step 302, the facility selects from among the paths identified in step 301 those paths having at their beginning or end a semantic relation having the input relation type. In accordance with the example, the facility selects the paths shown on lines 102–104 of FIG. 1. In steps 303–305, the facility loops through each path selected in step 302; that is, step 304 is repeated for each of these paths. In step 304, the facility determines the weight of the current selected path using the path weighting subsystem 234 (FIG. 2), which preferably obtains path weights generated by the salient semantic relation path generator in order to identify the most salient paths. In the example, the facility determines the path weights for the paths shown in lines 102–104 of FIG. 1 by retrieving the path weights shown in column 112 of FIG. 1, generated by the salient semantic relation path generator. In step 305, if any selected paths remain, the facility continues at step 303 to process the next selected path. In step 306, the facility determines a quantitative assessment of confidence about whether the input semantic relation should be inferred based upon the path weights determined in step 304. The facility may, for instance, calculate the average of these path weights, or select the maximum of these path weights. In step 307, the facility returns the quantitative assessment obtained in step 306. The returned quantitative assessment may be used to calculate confidence levels for each of the semantic relations under consideration (e.g., semantic relations (3), (4), and (5)), and select the semantic relation having the highest confidence level. Alternatively, the quantitative assessment may be compared to an absolute path weight threshold in order to make a binary determination of whether or not the semantic relation should be inferred. Such a path weight threshold is preferably derived empirically.

FIG. 4 is a flow diagram showing the steps preferably performed by the facility in order to determine whether an input semantic relation should be inferred in the second variation of the first embodiment of the invention. It can be seen by comparing FIGS. 3 and 4 that the sets of steps shown therein are generally similar. More specifically, steps 401–405 identify the most salient paths between the input words, select from the identified paths those beginning or ending with a semantic relation having the input relation type, and loop through each selected path as discussed above in conjunction with steps 301–303 and 305. The steps shown in FIG. 4 differ from those shown in FIG. 3 in that, in step 404, instead of determining the weight of the current selected path, the facility determines, for each selected path, the level of similarity between the intermediate word-that is, the word in the relation of the same type as the input semantic relation type other than the words of the input semantic relation—and the other input word using the similarity assessment subsystem 235 (FIG. 2). A preferred approach to quantitatively assessing the level of similarity between the meanings of a given pair of words is described in detail in U.S. patent application Ser. No. 08/904,223 entitled "Determining Similarity Between Words" (patent counsel's Docket No. 661005.524), which is hereby incorporated by reference. This preferably involves identifying the path patterns that connect the pair of words and calculating a similarity weight for the words based on the tendency of each of the identified path patterns to indicate similarity of words that they connect. In step 406, the facility bases the quantitative assessment of whether the input semantic relation should be inferred on the levels of similarity determined in step 404. It is this quantitative assessment that is returned in step 407.

FIG. 5 is a flow diagram showing the steps preferably performed by the facility in order to determine a quantitative measure of confidence about whether an input semantic relation should be inferred in accordance with the third variation of the first embodiment of the invention. It can be seen by comparing FIG. 5 to FIGS. 3 and 4 that the sets of steps shown in FIG. 5 generally constitute a combination of the steps shown in FIGS. 3 and 4. More specifically, steps 501–507 identify the most salient paths between the input words, select from the identified paths those beginning or ending with a semantic relation having the input relation type, and loop through each selected path as discussed above, e.g., in conjunction with steps 301–303 and 305. The steps shown in FIG. 5 differ from those shown in FIGS. 3 and 4 in that its steps use both the level of similarity between the intermediate word and the other input word in the selected path and the weight of the selected path to obtain a quantitative measure of confidence about whether to infer the input semantic relation. That is, in step 504, the facility determines the level of similarity between the intermediate word and the other input word using the similarity assessment subsystem 235 (FIG. 2). In step 505, if the determined level of similarity exceeds a similarity threshold, then the facility continues at step 506 to determine the weight of the current selected path, else the facility continues to the next selected path in step 507. In step 508, the facility bases the quantitative assessment of whether the input semantic relation should be inferred on the path weights determined in step 506. It is this quantitative assessment that is returned by the facility in step 509.

Figure 6:
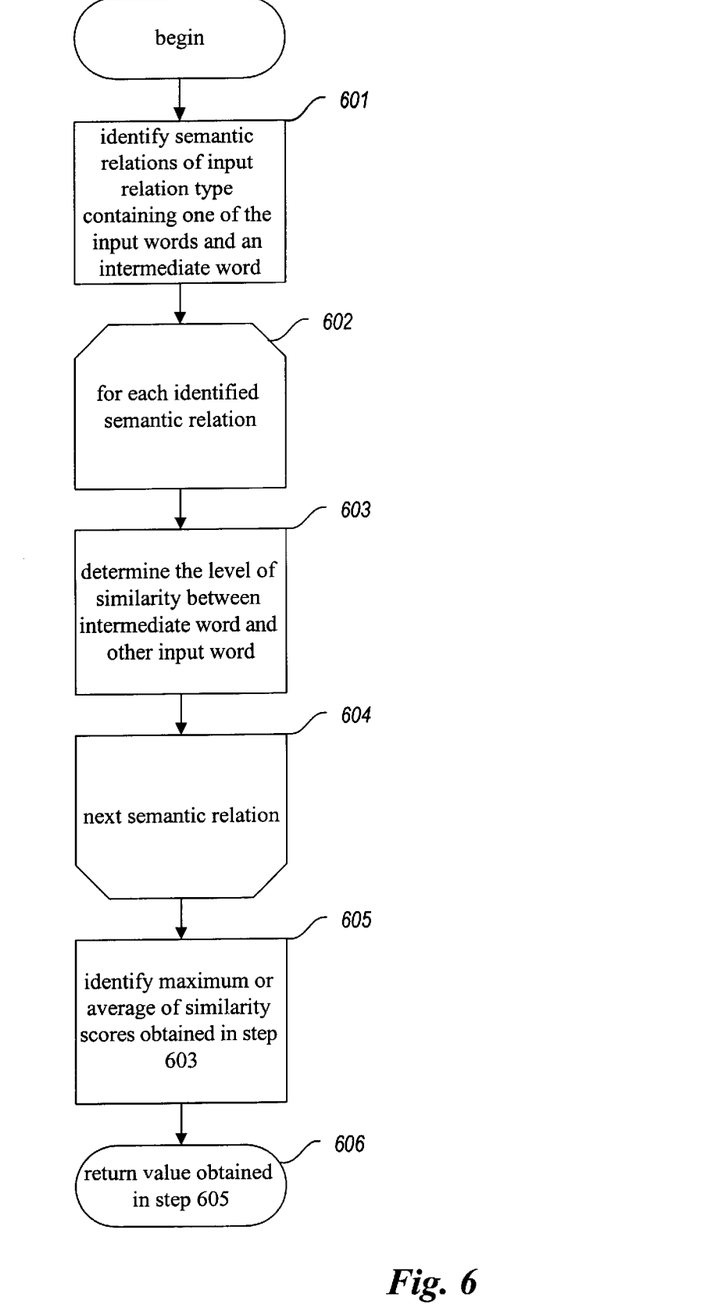
FIG. 6 is a flow diagram showing the steps preferably performed by the facility in order to determine a quantitative measure of confidence about whether an input semantic relation should be inferred in accordance with a first variation of a second embodiment of the invention.

FIG. 6 is a flow diagram showing the steps preferably performed by the facility in order to determine a quantitative measure of confidence about whether an input semantic relation should be inferred in accordance with the first variation of the second embodiment of the invention. In step 601, the facility identifies any semantic relations occurring in the lexical knowledge base that have the input relation type and contain one of the input words. The other word contained by each identified semantic relation is called the "intermediate word." In step 602–604, the facility loops through each semantic relation identified in step 601; that is, step 603 is repeated for each of the semantic relations. In step 603, the facility determines the level of similarity between the intermediate word and the other input word for the current identified semantic relation as discussed above in conjunction with step 404. In step 604, if any selected semantic relations remain, the facility continues at step 602 to process the next selected semantic relation. In step 605, the facility determines a quantitative assessment of confidence about whether the input semantic relation should be inferred based upon the levels of similarity determined in step 603. The facility may, for instance, calculate the average of these similarity levels, or select the maximum of the similarity levels. In step 606, the facility returns the quantitative assessment obtained in step 605. The returned quantitative assessment may be used to calculate confidence levels for each of the semantic relations under consideration (e.g., semantic relations (3), (4), and (5)), and select the semantic relation having the highest confidence assessment. Alternatively, the quantitative assessment may be compared to an absolute threshold in order to make a binary determination of whether or not the semantic relation should be inferred. Such a similarity threshold is preferably derived empirically based on the similarity weights assigned to pairs of words known to be synonyms and pairs of words known to not be synonyms.

Figure 7:
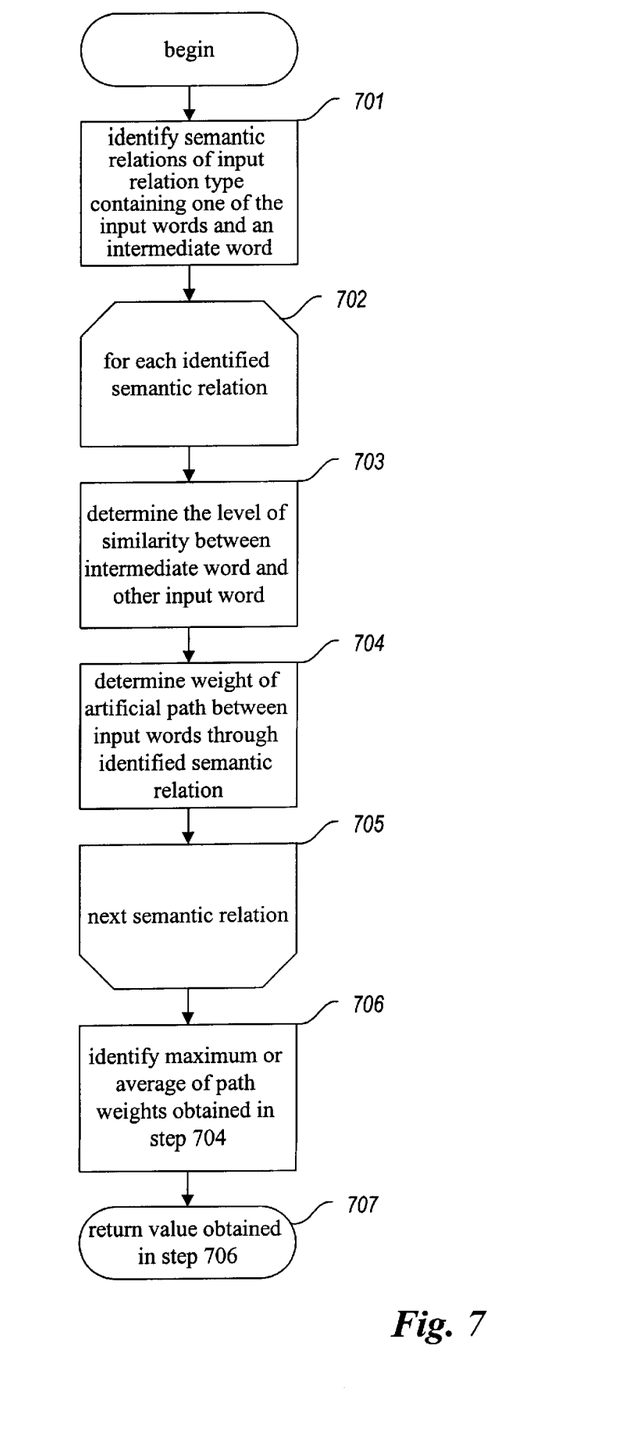
FIG. 7 is a flow diagram showing the steps preferably performed by the facility in order to determine a quantitative measure of confidence about whether an input semantic relation should be inferred in accordance with a second variation of the second embodiment of the invention.

FIG. 7 is a flow diagram showing the steps preferably performed by the facility in order to determine a quantitative measure of confidence about whether an input semantic relation should be inferred in accordance with the second variation of the second embodiment of the invention. It can be seen by comparing FIGS. 6 and 7 that the sets of steps shown therein are generally similar. More specifically, steps 701–703 and 705 identify semantic relations of the input semantic relation type containing one of the input words and loop through each identified semantic relation, determining the level of similarity between the intermediate word and the other input word for the semantic relation as discussed above in conjunction with steps 601–604. The steps shown in FIG. 7 differ from those shown in FIG. 6 in that step 704 of FIG. 7 further, for each identified semantic relation, determines the weight of an artificial path between the input words. As discussed above in conjunction with path (8), this artificial path is made up of two semantic relations: (a) the identified semantic relation, whose weight can be determined with reference to the lexical knowledge base, and (b) a special semantic relation whose weight indicates a level of similarity between the intermediate word and the other input word. The weight of this artificial path therefore incorporates both the weight of the identified semantic relation and a level of similarity between the intermediate word and the other input word. In step 706, the facility bases the quantitative assessment of whether the input semantic relation should be inferred on the artificial path weights determined in step 704. It is this quantitative assessment that is determined by the facility in step 707.

The processes described above for inferring valid semantic relations not occurring in a lexical knowledge base may be applied across the entire knowledge base to expand the set of semantic relations contained by the lexical knowledge base. When so expanded, the lexical knowledge base becomes a more effective tool by containing semantic relations that, while they cannot be obtained directly from the corpus, are nonetheless generally valid.

While this invention has been shown and described with reference to preferred embodiments, it will be understood by those skilled in the art that various changes or modifications in form and detail may be made without departing from the scope of the invention.

We claim:

1. A method in a computer system for determining whether a queried semantic relation is valid, the queried semantic relation comprising two query words and a query relation type relating the meanings of the query words, comprising:

identifying a first group of salient semantic relation paths relating the meanings of the two query words, the identified semantic relation paths each comprising an ordered chain of semantic relations, each semantic relation comprising two words and a relation type relating the meanings of the two words, such that each identified semantic relation path relates the meanings of the two query words via one or more intermediate words;

among the first group of semantic relation paths, identifying a second group of one or more semantic relation paths in which the first or last semantic relation is of the query relation type; and for each of the second group of semantic relation paths:
determining whether the intermediate word in the semantic relation of the semantic relation path having the query relation type and the query word not in the semantic relation of the semantic relation path having the query relation type have similar meanings, and if the intermediate word in the semantic relation of the semantic relation path having the query relation type and the query word not in the semantic relation of the semantic relation path having the query relation type have similar meanings, determining that the queried semantic relation is valid.

2. A computer-readable medium whose contents cause a computer system to determine whether a queried semantic relation is valid, the queried semantic relation comprising two query words and a query relation type relating the meanings of the query words, by:

identifying a first group of salient semantic relation paths relating the meanings of the two query words, the identified semantic relation paths each comprising an ordered chain of semantic relations, each semantic relation comprising two words and a relation type relating the meanings of the two words, such that each identified semantic relation path relates the meanings of the two query words via one or more intermediate words;

among the first group of semantic relation paths, identifying a second group of one or more semantic relation paths in which the first or last semantic relation is of the query relation type; and for each of the second group of semantic relation paths:
determining whether the intermediate word in the semantic relation of the semantic relation path having the query relation type and the query word not in the semantic relation of the semantic relation path having the query relation type have similar meanings, and if the intermediate word in the semantic relation of the semantic relation path having the query relation type and the query word not in the semantic relation of the semantic relation path having the query relation type have similar meanings, determining that the queried semantic relation is valid.

3. A method in a computer system for determining whether a queried semantic relation is valid, the queried semantic relation comprising two query words and a relation type relating the meanings of the query words, comprising:

identifying a first group of salient semantic relation paths relating the meanings of the two query words, the identified semantic relation paths each comprising an ordered chain of semantic relations, each semantic relation comprising two words and a relation type relating the meanings of the two words, such that each identified semantic relation path relates the meanings of the two query words via one or more intermediate words;

among the first group of semantic relation paths, identifying a second group of one or more semantic relation paths in which the first or last semantic relation is of the query relation type;

in each of the semantic relation paths of the second group, selecting the semantic relation of the query type;

among the second group of semantic relation paths, identifying a third group of one or more semantic relation paths in which the intermediate word in the selected semantic relation and the query word not in the selected semantic relation have similar meanings; and determining a quantitative assessment of whether the queried semantic relation is valid based upon the weights of the semantic relation paths of the third group.

4. The method of claim 3 wherein the determining determines the quantitative assessment of whether the queried semantic relation is valid based upon an average of the weights of the semantic relation paths of the third group.

5. The method of claim 3 wherein the determining determines the quantitative assessment of whether the queried semantic relation is valid based upon an maximum of the weights of the semantic relation paths of the third group.

6. The method of claim 3, further comprising determining that the queried semantic relation is valid where the quantitative assessment exceeds a validity threshold.

7. A computer-readable medium whose contents cause a computer system to determine whether a queried semantic relation is valid, the queried semantic relation comprising two query words and a relation type relating the meanings of the query words, by:

identifying a first group of salient semantic relation paths relating the meanings of the two query words, the identified semantic relation paths each comprising an ordered chain of semantic relations, each semantic relation comprising two words and a relation type relating the meanings of the two words, such that each identified semantic relation path relates the meanings of the two query words via one or more intermediate words;

among the first group of semantic relation paths, identifying a second group of one or more semantic relation paths in which the first or last semantic relation is of the query relation type;

in each of the semantic relation paths of the second group, selecting the semantic relation of the query type;

among the second group of semantic relation paths, identifying a third group of one or more semantic relation paths in which the intermediate word in the selected semantic relation and the query word not in the selected semantic relation have similar meanings; and determining a quantitative assessment of whether the queried semantic relation is valid based upon the weights of the semantic relation paths of the third group.

8. The computer-readable medium of claim 7 wherein the contents of the computer-readable medium further cause the computer system to determine that the queried semantic relation is valid where the quantitative assessment exceeds a validity threshold.

9. A method in a computer system for determining whether a queried semantic relation is valid, the queried semantic relation comprising two query words and a relation type relating the meanings of the query words, comprising:

identifying a first group of salient semantic relation paths relating the meanings of the two query words, the identified semantic relation paths each comprising an ordered chain of semantic relations, each semantic relation comprising two words and a relation type relating the meanings of the two words, such that each identified semantic relation path relates the meanings of the two query words via one or more intermediate words;

among the first group of semantic relation paths, identifying a second group of one or more semantic relation paths in which the first or last semantic relation is of the query relation type; and determining a quantitative assessment of whether the queried semantic relation is valid based upon the weights of the semantic relation paths of the second group.

10. The method of claim 9, further comprising determining that the queried semantic relation is valid where the quantitative assessment exceeds a validity threshold.

11. A computer-readable medium whose contents cause a computer system to determine whether a queried semantic relation is valid, the queried semantic relation comprising two query words and a relation type relating the meanings of the query words, by:

identifying a first group of salient semantic relation paths relating the meanings of the two query words, the identified semantic relation paths each comprising an ordered chain of semantic relations, each semantic relation comprising two words and a relation type relating the meanings of the two words, such that each identified semantic relation path relates the meanings of the two query words via one or more intermediate words;

among the first group of semantic relation paths, identifying a second group of one or more semantic relation paths in which the first or last semantic relation is of the query relation type; and determining a quantitative assessment of whether the queried semantic relation is valid based upon the weights of the semantic relation paths of the second group.

12. The computer-readable medium of claim 11 wherein the contents of the computer-readable medium further cause the computer system to determine that the queried semantic relation is valid where the quantitative assessment exceeds a validity threshold.

13. A method in a computer system for determining whether a queried semantic relation is valid, the queried semantic relation comprising two query words and a relation type relating the meanings of the query words, comprising:

identifying a first group of salient semantic relation paths relating the meanings of the two query words, the identified semantic relation paths each comprising an ordered chain of semantic relations, each semantic relation comprising two words and a relation type relating the meanings of the two words, such that each identified semantic relation path relates the meanings of the two query words via one or more intermediate words;

among the first group of semantic relation paths, identifying a second group of one or more semantic relation paths in which the first or last semantic relation is of the query relation type;

in each of the semantic relation paths of the second group, selecting the semantic relation of the query type; and determining a quantitative assessment of whether the queried semantic relation is valid based upon the level of similarity between the meanings of the intermediate word in the selected semantic relation and the query word not in the selected semantic relation in the semantic relation paths of the second group.

14. The method of claim 13 wherein the determining determines the quantitative assessment of whether the queried semantic relation is valid based upon an average of the weights of the semantic relation paths of the third group.

15. The method of claim 13 wherein the determining determines the quantitative assessment of whether the queried semantic relation is valid based upon an maximum of the weights of the semantic relation paths of the third group.

16. The method of claim 13, further comprising determining that the queried semantic relation is valid where the quantitative assessment exceeds a validity threshold.

17. A computer-readable medium whose contents cause a computer system to determine whether a queried semantic relation is valid, the queried semantic relation comprising two query words and a relation type relating the meanings of the query words, by:

identifying a first group of salient semantic relation paths relating the meanings of the two query words, the identified semantic relation paths each comprising an ordered chain of semantic relations, each semantic relation comprising two words and a relation type relating the meanings of the two words, such that each identified semantic relation path relates the meanings of the two query words via one or more intermediate words;

among the first group of semantic relation paths, identifying a second group of one or more semantic relation paths in which the first or last semantic relation is of the query relation type;

in each of the semantic relation paths of the second group, selecting the semantic relation of the query type; and determining a quantitative assessment of whether the queried semantic relation is valid based upon the level of similarity between the meanings of the intermediate word in the selected semantic relation and the query word not in the selected semantic relation in the semantic relation paths of the second group.

18. The computer-readable medium of claim 17 wherein the contents of the computer-readable medium further cause the computer system to determine that the queried semantic relation is valid where the quantitative assessment exceeds a validity threshold.

19. A method in a computer system for assessing the strength of an input semantic relation comprising two input words and an input relation type relating the input words, comprising:

identifying a salient semantic relation having the input relation type and relating one of the input words to an intermediate word other than the other input word;

generating a quantitative measure of the similarity of the intermediate word and the other input word; and generating a confidence weight for the input semantic relation that quantitatively reflects the level of confidence with which the input semantic relation should be inferred based upon the generated measure of similarity of the intermediate word and the other input word.

20. A computer-readable medium whose contents cause a computer system to assess the strength of an input semantic relation comprising first and second input words and an input relation type relating the first and second input words by:

identifying a salient semantic relation having the input relation type and relating the first input word to an intermediate word other than the second input word;

generating a quantitative measure of the similarity of the intermediate word and the second input word; and generating a confidence weight for the input semantic relation that quantitatively reflects the level of confidence with which the input semantic relation should be inferred based upon the generated measure of similarity of the intermediate word and the second input word.

21. A method in a computer system for assessing the strength of an input semantic relation comprising two input words and an input relation type relating the input words, comprising:

identifying a salient semantic relation having the input relation type and relating one of the input words to an intermediate word other than the other input word;

determining the weight of the identified semantic relation;

generating a quantitative measure of the similarity of the intermediate word and the other input word; and generating a confidence weight for the input semantic relation based upon both the generated quantitative measure of the similarity of the intermediate word and the other input word and the determined weight of the identified semantic relation determined.

22. The method of claim 21, further comprising determining that the input semantic relation should be inferred where the confidence weight exceeds a predetermined threshold.

23. The method of claim 21, further comprising determining the path weight of an artificial path comprising the identified semantic relation and a special semantic relation characterizing the level of similarity of the intermediate word and the other input word, and wherein the generating step generates a confidence weight based on the determined path weights.

24. A computer-readable medium whose contents cause a computer system to assess the strength of an input semantic relation comprising first and second input words and an input relation type relating the first and second input words by:

identifying a salient semantic relation having the input relation type and relating one of the input words to an intermediate word other than the other input word;

determining the weight of the identified semantic relation;

generating a quantitative measure of the similarity of the intermediate word and the other input word; and generating a confidence weight for the input semantic relation based upon both the generated quantitative measure of the similarity of the intermediate word and the other input word and the determined weight of the identified semantic relation determined.

25. The computer-readable medium of claim 24 wherein the contents of the computer-readable medium further cause the computer system to determine that the input semantic relation should be inferred where the confidence weight exceeds a predetermined threshold.

26. The computer-readable medium of claim 24 wherein the contents of the computer-readable medium further cause the computer system to determine the path weight of an artificial path comprising the identified semantic relation and a special semantic relation characterizing the level of similarity of the intermediate word and the other input word, and wherein the generating generates a confidence weight based on the determined path weights.

27. A computer memory containing a composite lexical knowledge base relating the meanings of words, the composite lexical knowledge base identifying a multiplicity of semantic relations each relating the meanings of an identified pair of words, the multiplicity of semantic relations comprising both:

semantic relations of a first type, each obtained by parsing a segment of natural language occurring in a corpus of natural language segments; and semantic relations of a second type, each obtained by inference from a plurality of semantic relations of the first type, such that the composite lexical knowledge base may be used to determine the validity of a selected semantic relation in the context of the corpus irrespective of whether the selected semantic relation can be obtained by parsing the corpus.

28. A computer-based system for assessing the strength of an input semantic relation comprising two input words and an input relation type relating the input words, comprising:

a relation identification subsystem that identifies a salient semantic relation having the input relation type and relating one of the input words to an intermediate word other than the other input word;

a similarity measurement subsystem that generates a quantitative measure of the similarity of the intermediate word and the other input word; and a weighting subsystem that generates a confidence weight for the input semantic relation that quantitatively reflects the level of confidence with which the input semantic relation should be inferred based upon the generated measure of similarity of the intermediate word and the other input word.

29. The computer-based system of claim 28, further comprising a semantic relation validation subsystem that determines whether the input semantic relation is valid based on the confidence weight generated by the weighting subsystem.

* * * * *

UNITED STATES PATENT AND TRADEMARK OFFICE
CERTIFICATE OF CORRECTION

PATENT NO.   : 6,138,085
DATED        : October 24, 2000
INVENTOR(S)  : Stephen D. Richardson

It is certified that error appears in the above-identified patent and that said Letters Patent is hereby corrected as shown below:

1 of 1

References: "5,317,504" should be --5,317,507--.

Signed and Sealed this

Twenty-second Day of May, 2001

Attest:

NICHOLAS P. GODICI

Attesting Officer

Acting Director of the United States Patent and Trademark Office